US006598819B2

United States Patent
Furomoto

(10) Patent No.: US 6,598,819 B2
(45) Date of Patent: Jul. 29, 2003

(54) SPINNING-REEL SPOOL

(75) Inventor: Yoshiyuki Furomoto, Kishiwada (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/124,273

(22) Filed: Apr. 18, 2002

(65) Prior Publication Data
US 2002/0170997 A1 Nov. 21, 2002

(30) Foreign Application Priority Data

May 18, 2001 (JP) ........................................ 2001-148816
May 18, 2001 (JP) ........................................ 2001-148817
May 18, 2001 (JP) ........................................ 2001-148818

(51) Int. Cl.[7] ........................ A01K 89/00; A01K 89/01; A01K 89/015
(52) U.S. Cl. ........................ 242/319; 242/246; 242/322
(58) Field of Search ................ 242/245, 246, 242/319, 322

(56) References Cited

U.S. PATENT DOCUMENTS 5,007,602 A * 4/1991 Carlsson ............... 242/246
5,219,131 A * 6/1993 Furomoto ............... 242/223
5,564,640 A * 10/1996 Egasaki et al. .......... 242/246
5,603,465 A * 2/1997 Henriksson .............. 242/246
5,988,547 A * 11/1999 Koelewyn ................ 242/246

FOREIGN PATENT DOCUMENTS

JP          6-16512 Y2     5/1994

* cited by examiner

Primary Examiner—Kathy Matecki
Assistant Examiner—Evan Langdon
(74) Attorney, Agent, or Firm—Shinjyu Global IP Counselors, LLP

(57) ABSTRACT

A spool has drag mechanism disposed on the rear, spool body, cover member, first sealing member, and second sealing member. The spool body has tubular bobbin trunk portion, and front/rear flange portions provided on the front/rear of the bobbin trunk portion. The drag mechanism includes: drag-handling unit that screws onto the fore end of the spool shaft; and friction unit disposed so as to contact the rear face of the rear flange. The rearward movement of the first friction unit is restricted by spool shaft. Cover member is installed on spool body to cover first friction unit from rear. First sealing member is fitted in between cover member and rear flange portion. Second sealing member is fitted in between spool shaft and cover member. Spool can control fluctuations in drag force due to liquids that seep into drag mechanism.

18 Claims, 11 Drawing Sheets

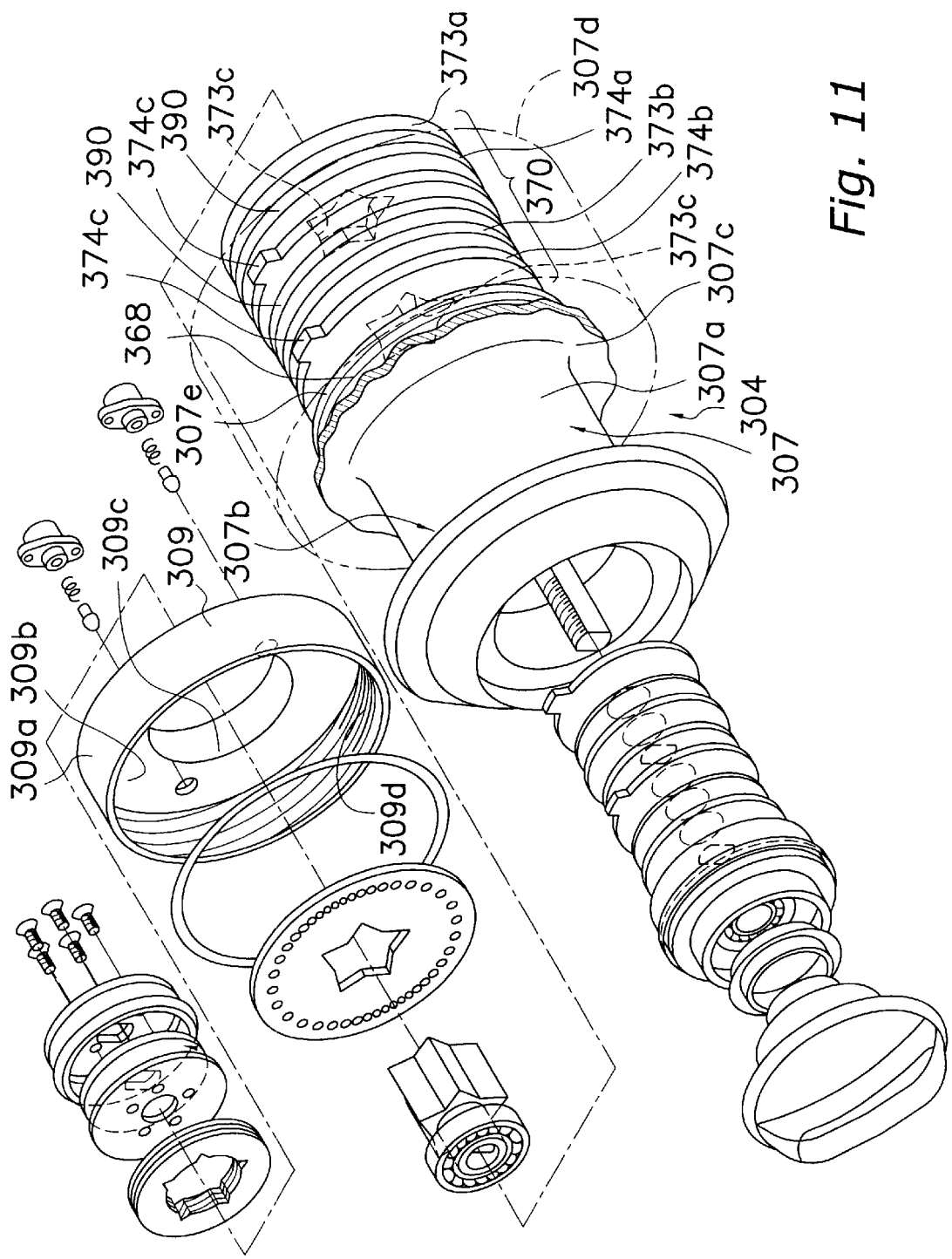

SPINNING-REEL SPOOL

BACKGROUND OF THE INVENTION

1. Field of the Invention

This invention generally relates to spools. More specifically, the present invention relates to spools mounted on spinning-reel spool shafts that are axially movably installed in the reel bodies of spinning reels.

2. Background Information

The spool in front-drag model spinning reels having built-in drag mechanisms is linked to the fore end of the spool shaft via the drag mechanism. This type of spool has a bobbin trunk portion, front/rear flange portions formed flaring at either end of the bobbin trunk portion, and a tubular skirt portion formed integrally with the rear flange portion. The drag mechanism includes a drag handling unit, and a friction unit that is pressed upon by the drag handling unit and is arranged within a drag-housing compartment formed in the interior of the bobbin trunk portion. The friction unit includes a first friction disk that is non-rotatable with respect to the spool shaft, and a second friction disk that is non-rotatable with respect to the spool.

Large-model spinning reels with a compact spool in which the bobbin trunk is formed small so that spooling capacity for thick, high-test fishing line may be secured are known. Because the diameter of the bobbin trunk is relatively small in this sort of spinning reel, securing drag-housing compartment in the bobbin trunk interior through which sufficient drag force corresponding to thick fishing line can be gained is difficult.

In this respect, a spool in which the drag-mechanism friction unit is disposed not in the bobbin trunk, but in the rear of the spool (specifically, within the skirt) is disclosed in Japanese Utility Model Post-Grant Gazette Pub. No. H06-16512. The spinning reel disclosed in the aforementioned gazette is formed with a cylindrical drag housing that projects rearward on the rear face of the rear flange portion; and a friction unit having first and second disks is housed in the drag housing interior. The friction unit is arranged in a state in which its movement rearward is restricted, where it can come into contact with the rear face of the rear flange. A drag-handling unit for pressing the friction unit is screwed onto the fore end of the spool shaft. A retaining means for locking the friction unit in place is fastened with locking screws to the rear face of the drag housing. The retaining means is mounted covering the rear of the friction unit.

Since the friction unit in a thus-configured conventional spool is locked in place by the retaining means, when the spool is undone from the spool shaft, the friction unit as such comes apart from the spool shaft along with the spool.

Conventionally, the bobbin trunk and rear-flange portions of the spool body are often formed integrally with the skirt portion. In this respect, metal highly resistant to corrosion must be used for the bobbin trunk portion and the rear flange, because they are constantly in contact with the fishing line. Consequently, on account of being formed integrally with the bobbin trunk portion, conventionally with aluminum alloys too, those that are of comparatively high corrosion resistance, or those that have been surface-treated for high corrosion resistance are used.

Issues Invention is to Solve

Since the friction unit is covered by the retaining means in the foregoing conventional configuration, foreign matter such as dust and grit is not apt to invade into the drag disks. Nevertheless, because a gap is left in between the skirt portion of the spool and the rotor, liquid is liable to seep in through the gap in the course of washing the reel with liquids. Should liquid seep in through the gap between the skirt and the rotor, the liquid is liable to seep into the interior of the drag mechanism, through the gap between the retaining member and the spool shaft, and the gap between the retaining member and the drag housing, wetting the disks within the friction unit and fluctuating the drag force.

Also since the bobbin trunk portion and the rear flange portion must be corrosion resistant, in the foregoing conventional configuration, lightweight alloys having high resistance to corrosion (e.g., aluminum alloys), or alloys that have been subjected to a surface treatment to heighten the corrosion resistance are used. Alloys whose corrosion resistance is high tend to have dull, whitish hues compared with those whose corrosion resistance is low, which makes it difficult by comparison with those whose corrosion resistance is low to obtain a metallic luster having a classic feel.

On the other hand, the skirt portion is a component covering the round-cylinder portion of the rotor so that fishing line will not coil onto it. Consequently, the skirt portion requires less corrosion resistance than the bobbin trunk and rear-flange portions, which are constantly in contact with fishing line to which saltwater has clung. Moreover, because the skirt portion is always exposed, the skirt portion is the most conspicuous among the components of the spool, and is the part on which adornment may be presented to lend a classic feel to the reel overall.

Nevertheless, in the foregoing conventional configuration, the skirt portion and the bobbin trunk and rear-flange portions are formed integrally as a member that has high resistance to corrosion or has been surface-treated to effect high corrosion resistance. Accordingly, the corrosion resistance of the fishing-line contact areas can be maintained. However, the skirt portion can only have dull hues, which is a problem in that improving the decorativeness of the skirt portion is difficult.

Furthermore, when the spool is retreated in the foregoing conventional configuration, the drag-mechanism friction unit is situated in the interior of the skirt portion where the round-cylinder portion of the rotor is adjacent, whereby the dimension of the friction unit in the spool-axial direction is restricted. The number of disks in the friction unit is therefore restricted, and gaining sufficient drag force is difficult, even if the disks are made large in diameter.

In view of the above, there exists a need for spool which overcomes the above mentioned problems in the prior art. This invention addresses this need in the prior art as well as other needs, which will become apparent to those skilled in the art from this disclosure.

SUMMARY OF THE INVENTION

An object of the present invention is to control fluctuations in drag force due to liquids seeping into the drag mechanism in a spool on the rear of which a drag mechanism is disposed.

Another object of the present invention is to improve decorativeness of the skirt portion, while maintaining the corrosion resistance of the areas that contact fishing line, in a spool on the rear of which a drag mechanism is disposed.

Still another object of the present invention is to make it easier to gain sufficient drag force in a spool on the rear of which a drag mechanism is disposed.

A spinning-reel spool having to do with the first aspect of the present invention is mounted on a spool shaft installed reciprocatingly in the reel body of the spinning-reel, and is furnished with: a spool body, a drag mechanism, a cover member, a first sealing means, and a second sealing means. The spool body has a tubular bobbin-trunk portion mounted rotatably on the spool shaft, and front and rear flange portions diametrically larger than the bobbin trunk portion and provided respectively on the front and rear of the bobbin trunk portion. The drag mechanism has: a drag-handling unit that screws onto fore end of the spool shaft to press the bobbin trunk portion, and a first friction unit disposed in a state enabling it to contact the rear face of the rear flange portion, and meanwhile restricting its movement rearward on the spool shaft. The cover member is a component installed non-rotatably on the spool body, to cover the first friction unit over its rear. The first sealing means is a means that is fitted in between the cover member and the spool body, and that seals a gap between the two. The second sealing means is a means that is fitted in between the spool shaft and the cover member, and that seals a gap between the two.

When the drag-handling unit in this spinning reel is turned, the first friction unit is pressed upon via the bobbin trunk portion. Because movement of the first friction unit rearward is restricted, when the bobbin trunk portion is pressed the pressure-contact force between the first friction unit and the bobbin trunk portion changes, varying the drag force. The first friction unit is covered over its rear by the cover member. Further, the gap between the cover member and the spool body is closed off by the first sealing means, and the gap between the cover member and the spool shaft is closed off by the second sealing means. Herein, the fact that the first friction unit is covered over its rear with the cover member, and that the gaps between the cover member, and the spool body and the spool shaft are sealed by sealing components, means that even if liquids seep through the gap between the spool and the rotor, the liquids are not likely to seep into the drag mechanism. Therefore, the first friction unit is not liable to become wet, which controls fluctuations in drag force.

A spinning-reel spool having to do with the second aspect of the invention is the spool set forth by the first aspect, wherein the spool body has a tubular skirt portion extending toward the rear from the rear flange on its outer periphery.

A spinning-reel spool having to do with the third aspect of the invention is the spool set forth by the second aspect, wherein a tip of a cylindrical portion of a rotor by which fishing line is wrapped around said bobbin trunk portion is positionable in between said skirt portion and said cover member outer peripherally. In this case, the tip of the rotor cylindrical portion is positionable in between the skirt portion and the outer periphery of the cover member. Therefore, though the drag mechanism is disposed on the rear part of the spool, the cover member does not collide with the fore end of the rotor cylindrical portion when the spool is drawn into its recede end. A compact reel may therefore be realized without, as far as the back-and-forth movement of the spool is concerned, having to take into consideration the dimension of the drag mechanism in the spool-axial direction.

A spinning-reel spool having to do with the fourth aspect of the invention is the spool set forth by any of the first through third aspects, further including a support mounted non-rotatably, axially immovably on the spool shaft, and rotatably supporting the bobbin trunk portion via a bearing; wherein the second sealing means is fitted to the support, and seals a gap between the support and the cover member. The fact in this instance that a support is provided on the spool shaft, and the second sealing means seals the gap between the support and the cover member, means that because the gap between the support and the cover member is made smaller, it is easier to seal the gap with the second sealing means.

A spinning-reel spool having to do with the fifth aspect of the invention is the spool set forth by any of the first through fourth aspects, wherein the second sealing means is a rimmed sealing member having a lip whose distal edge, contacting on the cover member, is pointed. In this case, since sealing is by the pointed-lip contact, rotational resistance is made smaller.

A spinning-reel spool having to do with the sixth aspect of the invention is the spool set forth by any of the first through fifth aspects, wherein: a tubular drag-housing portion is formed on the rear face of the rear flange portion, projecting rearward for housing the first friction unit; the cover member screws onto the outer circumferential surface of the drag-housing portion; and the first sealing means is an O-ring fitted in between the outer circumferential surface and the cover member. The fact in this instance that the cover member is fastened by screwing it onto the outer circumferential surface of the drag-housing portion makes using threaded holes and bolts unnecessary, simplifying the fastening structure for the cover member. Likewise, since sealing is done with the O-ring, the sealing structure is also simplified.

A spinning-reel spool having to do with the seventh aspect of the invention is the spool set forth by any of the first through sixth aspects, further including a third sealing means at the front face of the spool body, sealing a gap between the bobbin trunk portion and the spool shaft. In this case, since liquids are prevented from seeping in through the front face of the spool, the first friction is even less prone to becoming wet, which lessens fluctuations in the drag force even further.

A spinning-reel spool having to do with the eighth aspect of the invention is the spool set forth by any of the first through seventh aspects, further including a sounding mechanism installed on the cover member and issuing sound during operation of the drag mechanism. In this case, a sounding mechanism is furnished on a cover member that is the right thinness to vibrate relatively easily, and therefore a lucid sound is readily emitted when the drag is in operation.

A spinning-reel spool having to do with the ninth aspect of the invention is the spool set forth by any of the first through eighth aspects, wherein the first friction unit has one or a plurality of first disks non-rotatable with respect to the spool shaft, and one or a plurality of second disks non-rotatable with respect to the spool body and disposed alternately with the first disks. Drag force matching an application may in this case be set at will by means of the number of first and second disks arranged in alternation.

A spinning-reel spool having to do with the tenth aspect of the invention is the spool set forth by any of the seventh through ninth aspects, wherein a tubular drag-housing compartment is formed inside the bobbin trunk portion; and the drag mechanism includes a second friction unit pressed on by said drag-handling unit and housed in the drag-housing compartment in a state in which its movement axially is restricted. In this case, because a second friction unit is arranged inside the bobbin trunk portion, in addition to the first friction unit disposed on the rear part of the spool, still larger drag force may be gained.

A spinning-reel spool having to do with the eleventh aspect of the invention is the spool set forth by the tenth aspect, further including a second support unit, disposed in between the second friction unit and the drag-handling unit letting it shift axially on the spool shaft, and rotatably supporting the bobbin trunk portion via a bearing. In this case, supporting the bobbin trunk portion with two supports arranged spaced apart at an interval in sandwiching the second friction unit separates the spool supports at a sufficient interval, making the spool less likely to tilt, which makes shudder during drag operation unlikely to occur.

A spinning-reel spool having to do with the twelfth aspect of the invention is the spool set forth by the eleventh aspect, wherein the third sealing means has a third sealing member fitted in between the second support unit and the drag-handling unit and sealing a gap between the two, and a fourth sealing unit fitted in between the second support unit and the bobbin trunk portion and sealing a gap between the two. In this case, liquids are prevented from seeping into the spool body interior even with the spool supported by the second support unit, which prevents drag fluctuation.

A spinning-reel spool having to do with the thirteenth aspect of the invention is the spool set forth by the second aspect, wherein said skirt portion includes at least partially a tubular portion formed unitarily with said cover member.

At least a part of the skirt portion to this spinning-reel spool is a tubular portion formed integrally with the cover member. The cover member is for covering the first friction unit; and compared to the bobbin trunk and rear-flange portions, the frequency with which it is in contact with fishing line is slight, and therefore is under circumstances in which from a corrosion resistance aspect the restrictions are somewhat loose. Herein, since the cover member and the tubular part of the skirt portion—the restrictions on which are, from a corrosion resistance aspect, loose—are formed integrally, the material qualities of the tubular part of the skirt portion may be determined laying stress on decorativeness more than corrosion resistance. By the same token, the material qualities of and surface treatment for the spool body except for the tubular part of the skirt portion may be determined giving priority to corrosion resistance. This enables corrosion resistance to be maintained in the areas in contact with fishing line, and decorativeness of the skirt portion to be improved.

A spinning-reel spool having to do with the fourteenth aspect of the invention is the spool set forth by the thirteenth aspect, wherein the skirt portion has a first section formed integrally with the rear flange portion and extending rearward from the outer periphery of the rear flange portion, and a second section, as the tubular portion, formed integrally with the cover member and extending rearward from the first section; and the cover member is fixed to the spool body by screwing together with the first section on its inner circumferential surface. In this case, affixing the cover member to the spool body by screwing it into the inner peripheral area of the first section enables the attachment diameter of the cover member to be made large, which lets the cover member be affixed with a high tightening torque.

A spinning-reel spool having to do with the fifteenth aspect of the invention is the spool set forth by the thirteenth or fourteenth aspect, wherein the spool body is a highly corrosion-resistant aluminum alloy, or an aluminum alloy subjected to a high-corrosion-resistance surface treatment. In this case, the highly corrosion-resistant aluminum alloy, or aluminum alloy subjected to a high-corrosion-resistance surface treatment enables sustaining the spool body's corrosion resistance.

A spinning-reel spool having to do with the sixteenth aspect of the invention is the spool set forth by any of the tenth through fifteenth aspects, wherein said second friction unit is pressed on by said drag-handling unit and housed in said drag-housing compartment in a state restricting its movement axially, and has a plurality of third disks non-rotatable with respect to the spool shaft and a plurality of fourth disks arranged alternately with said third disks and non-rotatable with respect to the spool body.

A first friction unit having a plurality of first disks and second disks, contacting on the rear face of the spool-body rear flange, is arranged in this spinning-reel spool, and in the drag-housing compartment within the bobbin trunk portion, a second friction unit having a plurality of third disks and fourth disks is arranged. In this respect, because a plurality of disks is furnished respectively in two friction units, the number of disks in each friction unit may be made many. Therefore, even if the number of disks in the first friction unit is restricted, by means of the second friction unit sufficient drag force is made easy to gain.

A spinning-reel spool having to do with the seventeenth aspect of the invention is the spool set forth by the sixteenth aspect, further including drag disks fitted in between the first disks and second disks, as well as the third disks and fourth disks. In this case, because drag disks are interposed in between reciprocally rotating pairs of disks, the spool turns smoothly while the drag is working, and drag shudder is reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is an exploded oblique view of the spool of the spinning reel in accordance with the fourth embodiment of the present invention, corresponding to FIG. 5.

DETAILED DESCRIPTION OF THE PREFERRED EMBODIMENTS

First Embodiment

Figure 1:
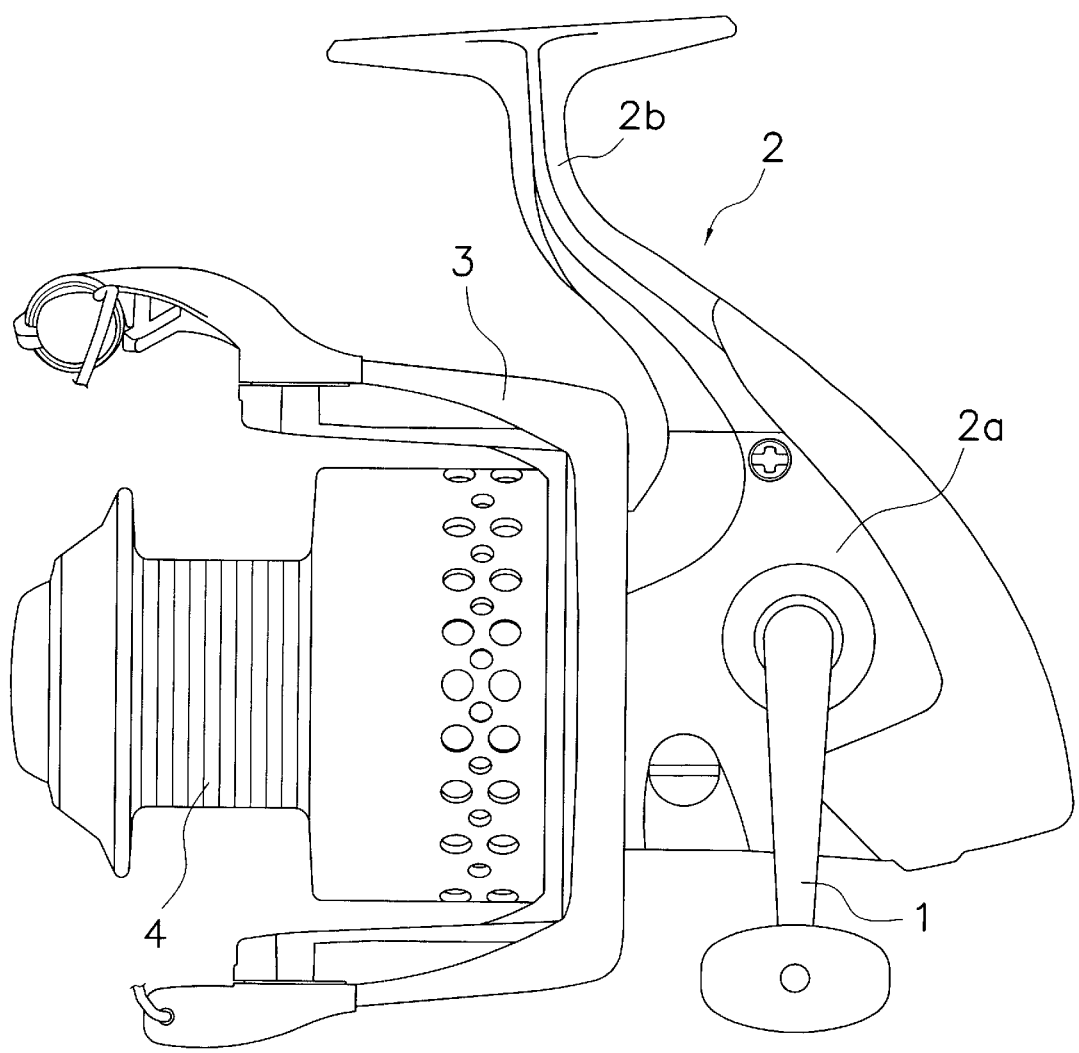
FIG. 1 is a left-side plan view of the spinning reel in accordance with the first embodiment of the present invention.

Set forth in FIG. 1, a spinning reel in which one embodiment of the present invention is adopted is furnished with: a reel unit 2 that rotatably carries a handle 1; a rotor 3; and a spool 4. The rotor 3 is rotatably carried on the front of the reel unit 2. The spool 4, onto the outer circumferential surface of which fishing line is wrapped, is arranged on the front of the rotor 3 to allow it to travel back and forth.

Figure 2:
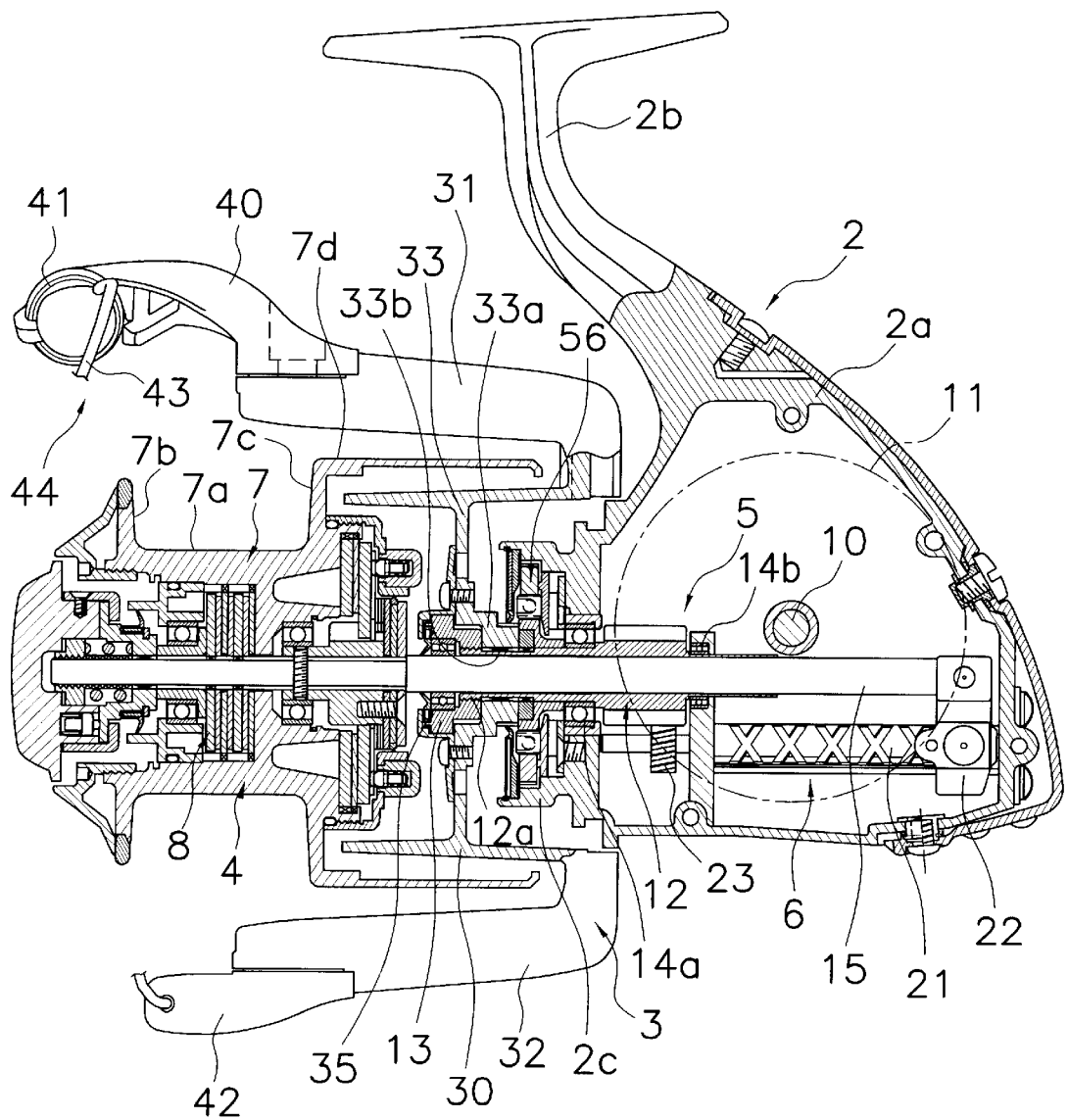
FIG. 2 is a left-side cross sectional view of the spinning reel in accordance with the first embodiment of the present invention.

The reel unit 2 includes a reel body 2a, and a rod-attachment foot 2b extending diagonally up/frontward from the reel body 2a. In the interior of the reel body 2a is a hollow as indicated in FIG. 2, and installed within the hollow are a rotor-drive mechanism 5 that rotates the rotor 3 by linkage to rotation of the handle assembly 1; and an oscillating mechanism 6 that pumps the spool 4 back and forth to wrap fishing line onto it uniformly. A forward-projecting tubular portion 2c is furnished on the front of the reel body 2a.

The rotor drive mechanism 5 includes a face gear 11 that rotates together with a handle shaft 10 with which the handle 1 is linked, and a pinion gear 12 that meshes with the face gear 11. The pinion gear 12 is tubularly formed, and its front portion 12a passes through the center portion of the rotor 3, where it is fastened onto the rotor 3 by a nut 13. The pinion gear 12 is rotatably supported at the mid-portion and rear end in the axial direction via respective bearings 14a, 14b in the reel unit 2. A parallel-chamfered portion 12b (FIG. 4) of predetermined length is formed on the front portion 12a of the pinion gear 12.

The oscillating mechanism 6, which is a traverse-cam model mechanism, is a device for causing a spool shaft 15 linked via a drag mechanism 8 to the center portion of the spool 4 to shift in the front-to-rear direction, to pump the spool 4 in the same direction. The oscillating mechanism 6 has a worm 21 disposed beneath and parallel to the spool shaft 15, a slider 22 that travels in the front-to-rear direction along the worm 21, and an intermediate gear 23 affixed to the fore end of the worm 21. The hind end of the spool shaft 15 is non-rotatably affixed to the slider 22. The intermediate gear 23 meshes with the pinion gear 12 via a (not illustrated) gear-down train.

The rotor 3, as shown in FIG. 2, includes a round-cylinder portion 30; and first and second rotor arms 31, 32 opposing each other furnished sideways on the round-cylinder portion 30. The round-cylinder portion 30 and the two rotor arms 31, 32 are, e.g., aluminum-alloy manufactured, and are formed unitarily.

A front wall 33 is formed on the front of the round-cylinder portion 30; and a boss portion 33a is formed in the central part of the front wall 33. An oblong through-hole 33b into which the chamfered portion 12b non-rotatably interlocks is formed in the center of the boss portion 33a, and the pinion-gear front portion 12a and the spool shaft 15 pierce the through-hole 33b. The nut 13 is situated on the front of the front wall 33, and a bearing that rotatably carries the spool shaft 15 is disposed inside the nut 13. A gap between the pinion gear 12 and the spool shaft 15 is set by the bearing 35. Accordingly, even if the spool shaft 15 should warp, it is not liable to have an affect on the rotation of the rotor 3—the rotor 3 rotation will be agile.

The first rotor arm 31 curving in an outward bulge extends frontward from the round-cylinder portion 30, and its joint with the round-cylinder portion 30 is curved broadening in the circumferential direction of the round-cylinder portion 30. A first bail-support member 40 is fitted pivotally onto the outer peripheral side of the fore end of the first rotor arm 31. A line roller 41 for guiding fishing line onto the spool 4 is fitted to the fore end of the first bail-support member 40.

The second rotor arm 32 curving in an outward bulge extends frontward from the round-cylinder portion 30, and its joint with the round-cylinder portion 30 is curved broadening in the circumferential direction of the round-cylinder portion 30. A second bail-support member 42 is fitted pivotally onto the inner peripheral side of the fore end of the second rotor arm 32.

A bail 43 of wire bent into a roughly U-shaped contour is fastened in between the line roller 41 and the second bail-support member 42. These first and second bail-support members 40, 42, the line roller 41, and the bail 43 compose a bail arm 44 that guides fishing line onto the spool 4. The bail arm 44 is pivotable in between a line-guiding posture, indicated in FIG. 2, and reversed from that into a line-releasing posture.

Figure 4:
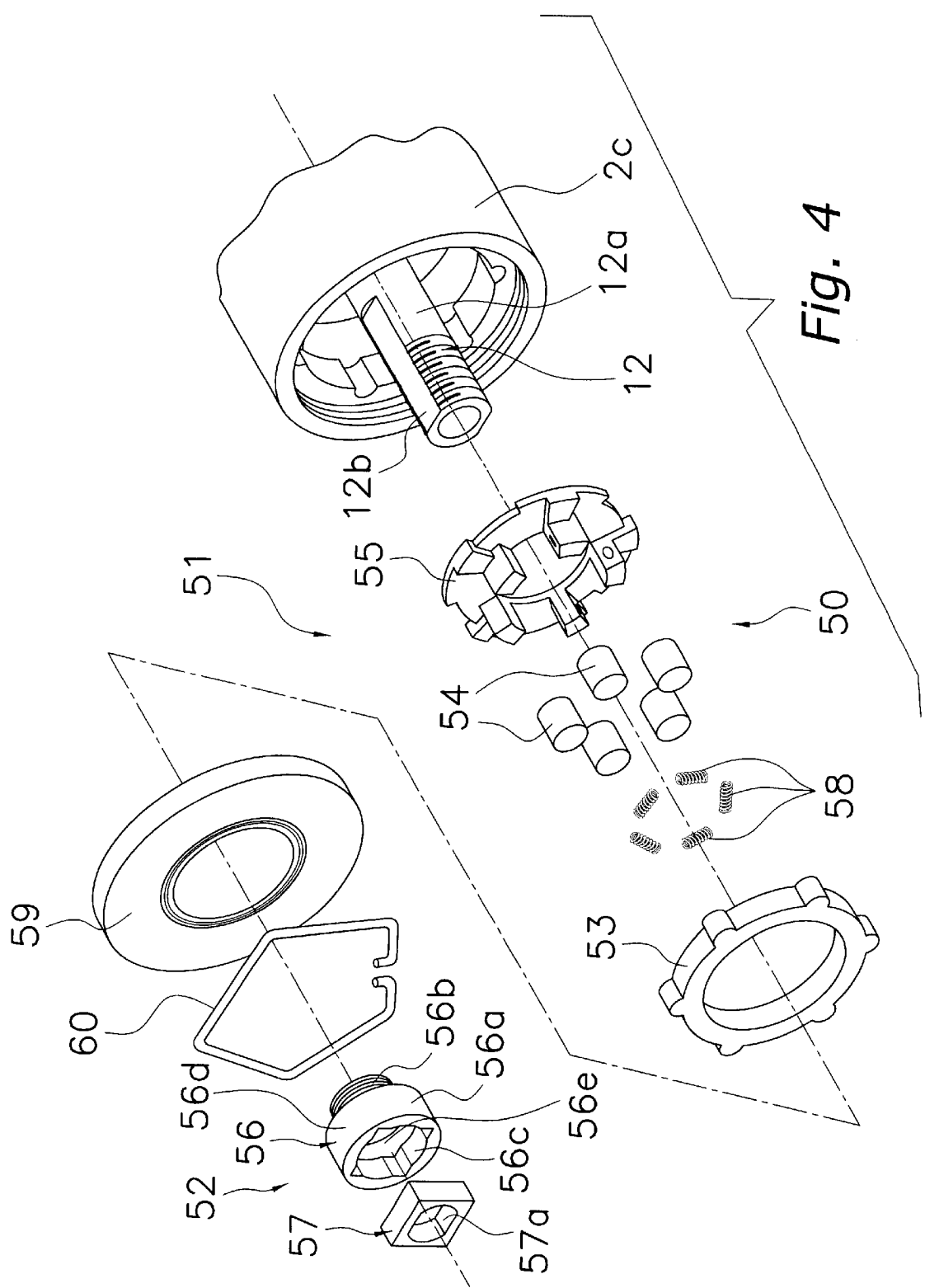
FIG. 4 is an exploded perspective view of the anti-reverse mechanism.

Along the inside of the round-cylinder portion 30, an anti-reverse mechanism 50 for constantly prohibiting reversal of the rotor 3 is disposed within the tubular portion 2c of the reel body 2a. The anti-reverse mechanism 50 includes, as shown in FIG. 4, a roller-type one-way clutch 51 whose inner race is free-rotating. The one-way clutch 51 includes: an inner race 52 into which the pinion gear is non-rotatably locked; an outer race 53 arranged coaxially with, and leaving a gap from the outer-circumferential side of, the inner race 52; a plurality of rollers 54 disposed enabling contact with both the inner race 52 and the outer race 53; spring members 58 urging on the rollers 54 to position them at equal intervals in the circumferential direction; and a spring retainer 55 that retains the spring members 58.

The inner race 52 includes an inner-race body 56, fitted rotatably to the pinion gear 12, and a coupling member 57 for coupling the inner-race body 56 non-rotatably to the pinion gear 12. The inner-race body 56 is a stepped-tubular member having a large-diameter portion 56a and a small-diameter portion 56b. An engagement recess 56c for non-rotatably interlocking with the coupling member 57 is formed in the large-diameter portion 56a. The engagement recess 56c is an approximately rectangular hollow. The outer-circumferential surface of the large-diameter portion 56a is a round, precision-machined rolling surface 56d on which the rollers 54 roll. A round mounting hole 56e is formed in the center of the small-diameter portion 56b. The mounting hole 56e fits the part of the pinion gear 12 where the chamfered portion 12b is not formed, and the pinion gear 12 is fit therein being centered.

Through the middle of the coupling member 57, which is a component whose outer periphery is approximately rectangular, an oblong through-hole 57a into which the chamfered portion 12b of the pinion gear 12 non-rotatably interlocks is formed. The outer periphery of the coupling member 57, being approximately rectangular in contour, engages into the engagement recess 56c in the inner-race body 56 to non-rotatably lock the inner-race body 56. The inner-race body 56 thereby is non-rotatably coupled with the pinion gear 12.

The outer race 53 is fitted non-rotatably into the front of the reel body 2a, and its inner-circumferential surface is humped into a cam face (not illustrated) for producing a wedging-effect against the rollers 54.

The spring retainer 55 is for holding the spring members 58, which keep the rollers 54 spaced apart at circumferential intervals, in place. The spring members 58, which are disposed equally spaced apart and urging the rollers 54 in the reverse-permit direction, are designed to speed the response of the rotor 3 to reverse-permitting action when the rotor 3 rotates in the line-retrieving direction from the state in which the rotor 3 is urged in the line reel-out direction.

At the front of the one-way clutch 51 a rimmed sealing plate 59 for preventing liquids form seeping into the interior of the reel body 2a is fitted on the tubular portion 2c. The sealing plate 59 is locked in place by a pentagonally bent spring-clip 60.

Figure 3:
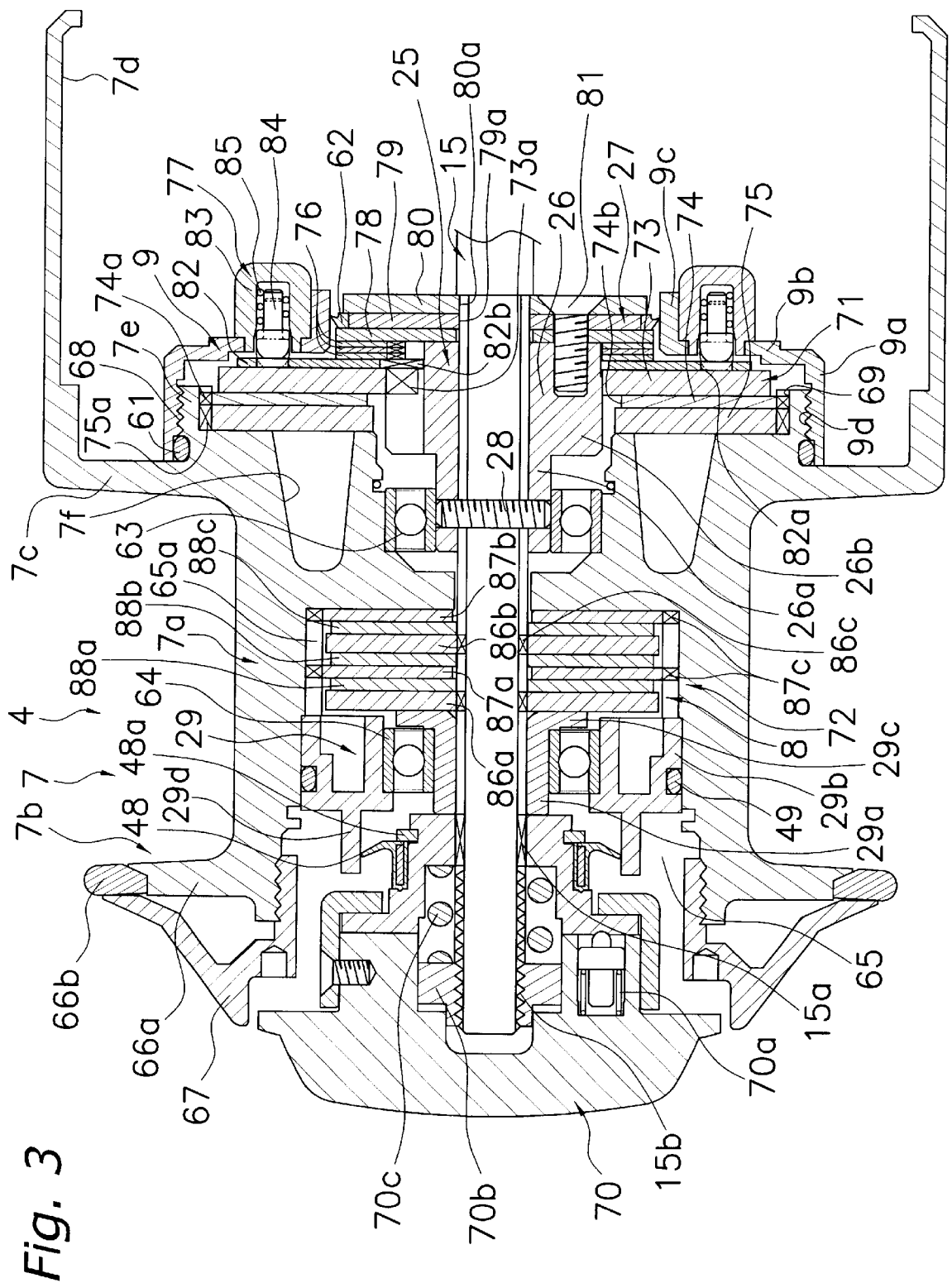
FIG. 3 is an enlarged sectional view of the spool section of the spinning reel in accordance with the first embodiment of the present invention.
Figure 5:
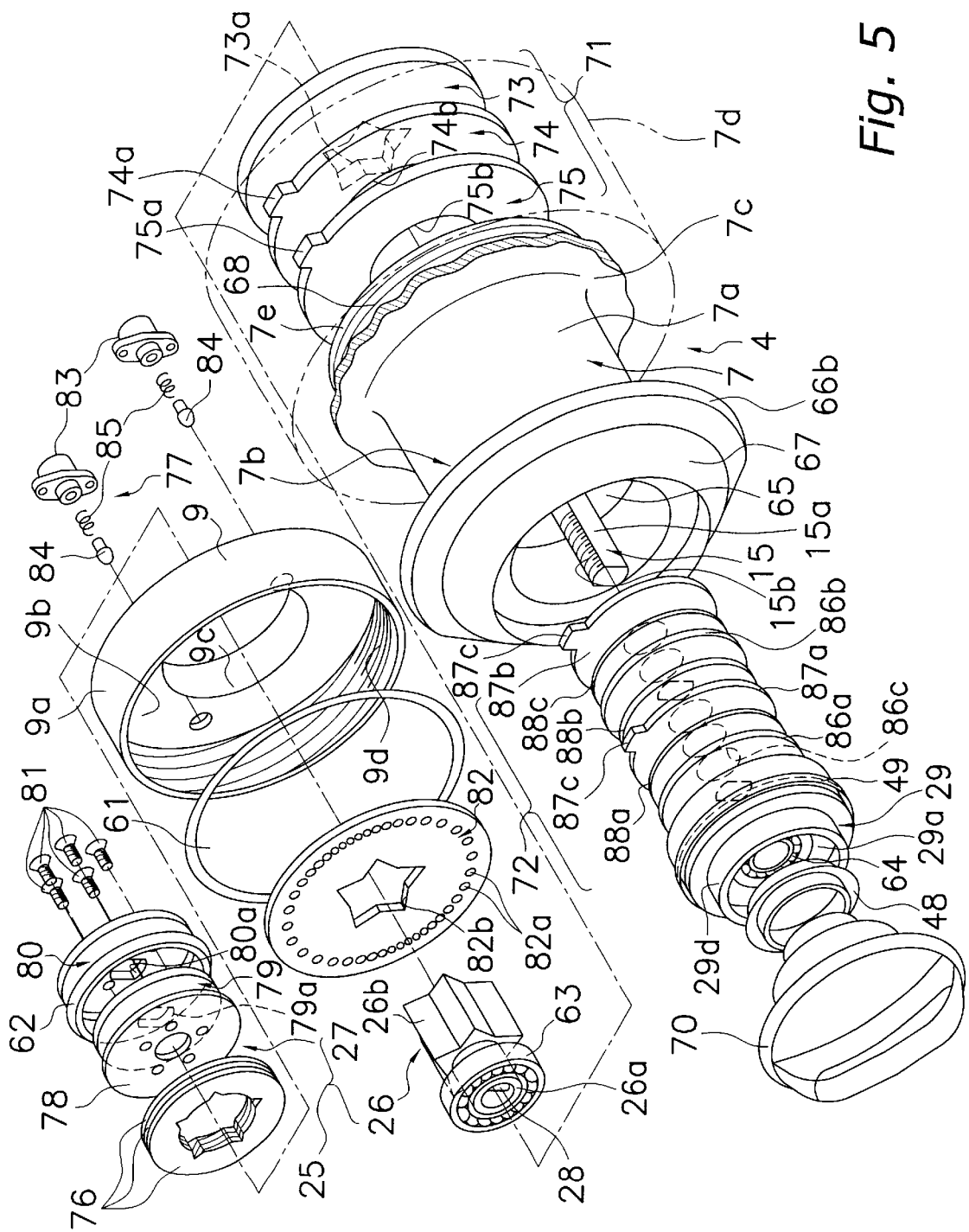
FIG. 5 is an exploded oblique view of the spool.

The spool 4, as shown in FIG. 2, is disposed between the first rotor arm 31 and the second rotor arm 32 on the rotor 3. The spool 4 includes, as illustrated in FIGS. 3 and 5: a spool body 7 rotatably mounted on the spool shaft 15 by means of two bearings 63, 64; the drag mechanism 8, through which the spool body 7 fits to the fore end of the spool shaft 15; a cover member 9 covering the rear part of the spool body 7: and first and second sealing members 61, 62 as first and second sealing means.

Parallel chamfers 15a for interlocking with the drag mechanism 8 non-rotatably are formed on the outer circumferential surface of the spool shaft 15, stretching from its tip to the front of the rotor 3. A male-threaded portion 15b onto which a (later-described) drag-handling unit 70 screws for operating the drag mechanism 8 to further adjust the drag force, is formed on the fore end of the portion with the chamfers 15a.

A first support unit 25 for rotatably supporting the spool 4, and at the same time restricting movement of a (later-described) first friction unit 71 rearward, is mounted forward of the rotor 3 on the spool shaft 15. The first support unit 25 includes a tubular support-unit body 26, and a restrictor 27 that restricts movement of the support-unit body 26 rearward and at the same time makes the support-unit body 26 non-rotatable with respect to the spool shaft 15. The support-unit body 26 includes a small-diameter, tubular bearing-mount portion 26a onto which the bearing 63 mounts, and a large-diameter interlocking portion 26b formed into a five-pointed-star contour for non-rotatably locking the drag mechanism 8. The rear-face of the outer race of the bearing 63 is locked in place by a not-illustrated clip element. The support-unit body 26 is non-rotatably and axially immovably mounted to the spool shaft 15 also by a stop-screw 28, which is rotatably screwed into the spool shaft 15 along its diametric direction.

The restrictor 27 includes three regulating disks 78, 79 and 80 fixed to the support-unit body 26. Regulating disk 78 with the regulating disk 79 clamps the second sealing member 62. The second sealing member 62 is fitted onto the outer periphery of regulating disk 79, which is smaller in diameter than regulating disk 78. Regulating disk 79 in the center has an oblong-shaped through-hole 79a into which the chamfered portion 15a of the spool shaft 15 interlocks. Regulating disk 80, which is larger in diameter than regulating disk 79, in the center has an oblong-shaped through-hole 80a into which the chamfered portion 15a of the spool shaft 15 interlocks. Furthermore, regulating disk 80 is situated at the rear end of the chamfered portion 15a of the spool shaft 15, where the regulating disk 80 is disposed unable to shift rearward in the axial direction, due to the step-difference between the chamfered portion 15a and the round portion of the spool shaft 15. Movement of the support-unit body 26 and the first friction unit 71 rearward in the spool axial direction is thereby restricted. These three regulating disks 78–80 are fixed to the support-unit body 26 by five countersunk bolts that penetrate through the rear of regulating disk 80 and are screwed into the rear face of the support-unit body 26. Consequently, the support-unit body 26 is further made firmly non-rotatable with respect to the spool shaft 15.

A second support unit 29 for rotatably supporting the spool 4 is mounted in the interior of the spool body 7 on the spool shaft 15. The second support unit 29 includes an approximately tubular inside component 29a, fitted axially shiftably on the spool shaft 15, and an approximately tubular outside component 29b fixed to the inner periphery of the spool body 7. A bearing 64 is fitted in between the inside component 29a and the outside component 29b. The inside component 29a has a flange portion 29c on its rear face for pressing on the drag mechanism 8.

A frontward-projecting tubular seal-mount 29d, which the distal edge of a rimmed third sealing member 48 fitted to the drag-handling unit 70 to be described later contacts, is formed in the mid-portion of the front face of the outside component 29b. Further, a fourth sealing member 49 consisting of an O-ring is fitted in between the outside component 29b and the spool body 7. The third sealing member 48 and the fourth sealing member 49 compose a third sealing means for preventing liquids from seeping through the front of the spool 4 into the interior. Herein, furnishing the outside component 29b—on the mid-portion of the front face of which the seal mount 29d is at the same time furnished—is in order to maintain compatibility of the drag-handling unit 70, by making it so that even with spool-body 7 bobbin trunk portions 7a (later-described) of varying diameter, the difference may be assimilated depending on the shape and the presence/absence of the outside component 29b. Even when gaps between the drag-handling unit 70 and a drag-housing compartment 65 (described later) varies depending on the diameter, the sealing position does not vary. That is, if the diameter of the bobbin trunk portion 7a is to be smaller, the distal edge of a third sealing member 48 may be brought into direct contact with the inner circumferential surface of the bobbin trunk portion 7a, instead of the seal mount 29d.

The spool body 7, a larger-smaller, dual-stage, cylindrical component obtained by, e.g., drop-forging aluminum alloy, includes: the tubular bobbin trunk portion 7a, outer-circumferentially onto which fishing line wraps; larger-diameter front and rear flange portions 7b, 7c, furnished on the front and rear of the bobbin trunk portion 7a; and a tubular skirt portion 7d extending rearward from the rear flange portion 7c.

The tubular drag-housing compartment 65, which houses a (later-described) second friction unit 72 of the drag mechanism 8, is formed in the interior of the front end of the bobbin trunk portion 7a. A pair of interlock slots 65a into which the drag mechanism 8 non-rotatably interlocks is formed in the drag-housing compartment 65, running in the axial direction. An annular hollowed-out portion 7f is formed in the rear-end face of the bobbin trunk portion 7a. The hollowed-out portion 7f is made in order to design for a lighter weight spool 4.

The front flange portion 7b includes a an inside flange part 66a formed integrally with the bobbin trunk portion 7a, and an outside flange piece 66b, manufactured of a hard ceramic material fitted on the outer circumferential part of the inside flange part 66a. The outside flange piece 66b is designed to prevent scratching and wear due to contact with fishing line cast out from the spool 4. The outside flange piece 66b is fastened to the inside flange part 66a by a flange-fastening member 67 affixed by screwing into the front-end inner periphery of the bobbin trunk portion 7a.

The rear flange portion 7c, slightly larger in diameter than the front flange portion 7b, is formed integrally with the bobbin trunk portion 7a. A tubular drag-housing portion 7e spaced apart from the inner circumferential side of the skirt portion 7d is formed projecting rearward on the rear face of the rear flange portion 7c. The (later-described) first friction unit 71 of the drag mechanism 8 is housed within the drag-housing portion 7e. Male threads 68 onto which the cover member 9 is affixed by screwing are formed on the outer circumferential surface of the drag-housing portion 7e. Likewise, on the inner circumferential surface of the drag-housing portion 7e, an opposing pair of interlock slots 69 for non-rotatable engagement with the first friction unit 71 is formed. The interlock slots 69 are formed running in the spool-axial direction.

The skirt portion 7d is formed integrally with the rear flange portion 7c, and extends rearward tubularly from the outer periphery of the rear flange portion 7c. This extended hem is situated in a position in which, when the spool 4 has traveled to the front-advanced end, it slightly overlaps the fore end of the round-cylinder portion 30 of the rotor 3.

Fitted in between the spool body 7 and the spool shaft 15, the drag mechanism 8 is a machine for effecting drag force on the spool 4. The drag mechanism 8 includes: the drag-handling unit 70, disposed on the fore end of the spool shaft 15 for adjusting the drag force by hand; and the first and second friction units 71, 72, which are pressed upon by the drag-handling unit 70.

The drag-handling unit 70 interiorly includes: a drag-adjustment sounding mechanism 70a that issues sound when the drag is adjusted; a nut 70b screwed onto the male-threaded portion 15b formed on the fore end of the spool shaft 15; and a coil spring 70c that increases/decreases the drag force. Twisting the drag-handling unit 70 with respect to the spool shaft 15 shifts the nut 70b back and forth with respect to the spool shaft 15. The shifting of the nut 70b extends/compresses the coil spring 70c, changing the compressive force on the first friction unit 71 and the second friction unit 72, and adjusting the drag force. The third sealing member 48 as earlier described is fitted onto the outer-circumferential surface of the rear portion of the drag-handling unit 70, thereby preventing liquids from seeping into the spool body 7 interior. The third sealing member 48 is a rimmed sealing element made from an annular elastic substance having a forward-sloping lip, and is held fast by a fastening ring 48a.

The first friction unit 71 includes: a first disk 73, non-rotatable with respect to the spool shaft 15; a second disk 74, non-rotatable with respect to the spool body 7 and positioned to enable it to be compressed with the first disk 73; and an, e.g., aluminum-alloy fabricated protective disk 75 disposed contacting the rear face of the rear flange portion 7c. In addition, via three adjustment washers 76 the restrictor 27 restricts movement of the first friction unit 71 rearward in the spool axial direction. The cover member 9 covers the first friction unit 71; and liquids are prevented from seeping into the interior through the rear thereof by the first and second sealing members 61, 62.

Through the center of the first disk 73, a component fabricated from, e.g., a stainless alloy, is an interlock hole 73a having a five-pointed-star contour, into which the interlocking portion 26b formed on the support-unit body 26 in the first support unit 25 interlocks. Accordingly, the first disk 73 is non-rotatable with respect to the spool shaft 15. Because the spool shaft 15 is non-rotatable with respect to the reel unit 2, the first disk 73 is made non-rotatable with respect to the reel unit 2. Rearward movement of the first disk 73 is restricted by contact with the restrictor 27 via a (later-described) sound-emitting disk 82.

The second disk 74 is a component fabricated of, e.g., graphite, and generates drag force by rotating relative to the first disk 73. On the outer periphery of the second disk 74 are tabs 74a that interlock into the interlock slots 69; and at the inner periphery is a through-hole 74b through which the first support unit 25 passes. The second disk 74 is thereby non-rotatable with respect to the spool body 7.

The protective disk 75, in that the hollowed-out portion 7f for lightening the weight is provided in the inner margin of the rear flange portion 7c, made of comparatively soft aluminum, is a component furnished so as not to decrease the drag surface area, so that uniform drag force acts on the second disk 74. On the outer periphery of the protective disk 75 are tabs 75a that interlock into the interlock slots 69 formed in the drag-housing portion 7e; and at the inner periphery is a through-hole 75b through which the first support unit 25 passes. The protective disk 75 is thereby non-rotatable with respect to the spool body 7.

A drag-sounding mechanism 77 that issues sound when the drag operates is arranged on the rear face of the first disk 73. The drag-sounding mechanism 77 includes: the sound-emitting disk 82, disposed in between the first disk 73 and the restrictor 27; two sound-emitting pins 84 fitted free to shift in a pair of guide parts 83 affixed to the cover member 9; and two coil springs 85 that urge each sound-emitting pin 84 toward the sound-emitting disk 82. The sound-emitting disk 82 is fitted non-rotatably onto the support-unit body 26 in the first support unit 25, whereby it is non-rotatable with respect to the spool shaft 15. A number of recesses 82a spaced at circumferential intervals are formed along a location in the sound-emitting disk 82 opposing the sound-emitting pins 84. An interlock hole 82b having a five-pointed-star contour, into which the interlocking portion 26b interlocks is formed through the center of the sound-emitting disk 82. The guide parts 83, fixed to the cover member 9 with screws, are close-ended tubular components in the interiors of which the sound-emitting pins 84 are shiftably fitted. In a thus-configured drag-sounding mechanism 77, when the drag acts and the spool 4 rotates relative to the spool shaft 15, the sound-emitting pins 84 oscillate by repeatedly advancing/retreating with respect to the sound-emitting disk 82, issuing sound.

The second friction unit 72 includes: two third disks 86a, 86b non-rotatable with respect to the spool shaft 15, which are fabricated from, e.g., a stainless alloy; and two fourth disks 87a, 87b that are non-rotatable with respect to the bobbin trunk portion 7a. The third disks 86a, 86b are arranged alternately with the fourth disks 87a, 87b, and three drag disks 88a–88c manufactured of carbon graphite are fitted in between them. Third disk 86a is arranged opposite the flange portion 29c formed on the inside component 29a of the second support unit 29, and an oblong-shaped through-hole 86c into which the chamfered portion 15a formed on the spool shaft 15 interlocks is formed at the inner margin. Third disk 86b likewise has a through-hole 86c. Accordingly, the third disks 86a, 86b are made non-rotatable with respect to the spool shaft 15. Tabs 87c that engage into the interlock slots 65a formed in the drag-housing compartment 65 are formed projecting on the outer periphery of the fourth disks 87a, 87b. Accordingly, the fourth disks 87a, 87b are made non-rotatable with respect to the spool 4. Fourth disk 87a is fabricated from a stainless alloy. Fourth disk 87b is manufactured from, e.g., carbon graphite, and can contact against the wall part of the drag-housing compartment 65, wherein it presses on the spool body 7 at the rear.

The cover member 9 is designed to reattachably detach the first friction unit 71 together with the spool body 7 when the spool 4 is taken off of the spool shaft 15 by undoing the drag-handling unit 70 from the spool shaft 15. The cover member 9 includes: a first cylindrical portion 9a situated on the outer periphery of the drag-housing portion 7e; a circular plate portion 9b, extending inward from the first cylindrical portion 9a and located to the rear of the first friction unit 71; and a second cylindrical portion 9c that extends rearward from the circular plate portion 9b. Female threads 9d that screw together with the male threads 68 formed on the outer circumferential surface of the drag-housing portion 7e are formed on the inner circumferential surface of the first cylindrical portion 9a. The first sealing member 61 is fitted to the outer periphery of the drag-housing portion 7e between it and the female threads 9d, to the fore-end side thereof. A pair of through-holes into which the guide parts 83 fit is formed in the circular plate portion 9b. The distal edge of the second sealing member 62 fitted onto regulating disk 79 contacts on the second cylindrical portion 9c. A gap is formed in between the outer circumferential surface of the cover member 9 and the skirt portion 7d, and the fore end of the rotor 3 round-cylinder portion 30 comes into a position in the gap. Accordingly, when the spool 4 is retracted, this lets the spool 4 in the retract-position come in close to the reel unit 2, maintaining compactness in the fore-aft length of the reel.

The first sealing member 61 consists of an O-ring, and seals the gap between the outer periphery of the cover member 9 and the drag-housing portion 7e, to prevent liquids from seeping into the first friction unit 71 from the outer periphery of the cover member 9. The second sealing member 62 is a sealing element having a lip leaning at the distal edge toward the rear. The second sealing member 62 seals the gap between the inner periphery of the cover member 9 and the spool shaft 15, to prevent liquids from seeping into the first friction unit 71 from the inner periphery of the cover member 9. The fact that the first friction unit 71 is thus sealed by the two sealing members 61, 62, means that liquids are not liable to seep into the first friction unit 71 and the second friction unit 72, and that fluctuations in drag force due to water-wetting are not liable to arise. Likewise, the fact that the liquids are also prevented from seeping into the front of the spool 4 by the third sealing member 48 and the fourth sealing member 49 means that liquids are not liable to seep into the second friction unit 72 and the first friction unit 71 through the front of the spool 4.

Reel Handling and Operation

Before angling, the drag force is adjusted to suit the size and type of fish. In adjusting the drag force, a convenient length of fishing line is reeled out, and a weight corresponding to the targeted fish is attached to the leading end of the fishing line. Then the drag-handling unit 70 is turned to set an appropriate drag force, and the handle 1 is cranked to check the action of the drag. When the drag-handling unit 70 is turned clockwise, for example, the drag-handling unit 70 is shifted to the rear by the nut 70b screwed onto the spool shaft 15, which further, via the coil spring 70c, presses on the component 29a of the second support unit 29; this compressive force is transmitted to the second friction unit 72, and meanwhile is also transmitted to the first friction unit 71 via the spool body 7. The drag force is thereby made larger. At that time, the drag-adjustment sounding mechanism 70a generates a rhythmical clicking sound. Herein, because the first friction unit 71 is disposed in the comparatively large space in the rear part of the spool body 7, a large drag force may still be obtained even if the spool 4 is a deep-channel model with a reduced-diameter bobbin trunk portion 7a.

When casting, the bail arm 44 is flipped over into the line-releasing posture. The first bail-support member 40 and the second bail-support member 42 pivot accordingly. The fishing rod is cast in this state, with the index finger of the hand that grips the fishing rod hooking the fishing line. The fishing line is thereupon flung out vigorously under the weight of the terminal tackle. When the handle 1 is rotated in the line-retrieving direction after the terminal tackle has landed in the water, the rotor 3 rotates in the line-retrieving direction through the agency of the rotor-drive mechanism 5. When the rotor 3 rotates, a (not-illustrated) bail-flipping mechanism returns the bail arm 44 into the line-retrieving position wherein, because the rotor is prohibited from reversing, casting-out of the fishing line stops.

When the fishing line is to be wound in, the handle 1 is rotated in the line-retrieving direction. The rotation is then transmitted via the face gear 11 and the pinion gear 12 to the rotor 3, rotating the rotor 3. When the rotor 3 rotates, the fishing line, guided by the line roller 41, is wrapped onto the spool 4. In this situation, the deep-channel model spool 4, whose bobbin trunk portion 7a is small in diameter compared to the diameter of the front and rear flange portions 7b, 7c, keeps the overall radial dimension of the spool small, and allows for a large quantity of line-windings.

When a fish is caught, the drag mechanism 8 will at times operate. When the drag mechanism 8 operates, sliding is produced respectively between the first disk 73 and the second disk 74 in the first friction unit 71, and between the third disks 86a, 86b and the fourth disks 87a, 87b in the second friction unit 72, whereby the fishing line reels out under the set drag force.

At times when angling and when washing the reel, the reel is wet with water, and liquids get into the gap between the skirt portion 7d and the round-cylinder portion 30 of the rotor 3. Nevertheless, because the first and second seals 61, 62 are fitted to the outer periphery and inner periphery of the cover member 9, even if liquids seep in through the rear, the liquids will not encroach into the interior of the first friction unit 71.

To undo the spool 4 from the spool shaft 15, the drag-handling unit 70 is turned counterclockwise. The drag-handling unit 70 then comes off the spool shaft 15, which lets the spool 4 be taken off of the spool shaft 15. At this time, the first friction unit 71 comes off the first support unit 25 together with the bearing 63 and the spool body 7, because the cover member 9 covering it is mounted on the rear flange portion 7c. Likewise, because the second support unit 29 caps the front portion of the second friction unit 72, the second friction unit 72 comes off the spool shaft 15 together with the bearing 64 and the second support unit 29. In this way, the drag mechanism may be detached/reattached unitarily together with the spool body 7. Accordingly, among the component parts of the spool 4 only the first support unit 25 and the adjustment washers 76 are left.

Second Embodiment

Figure 6:
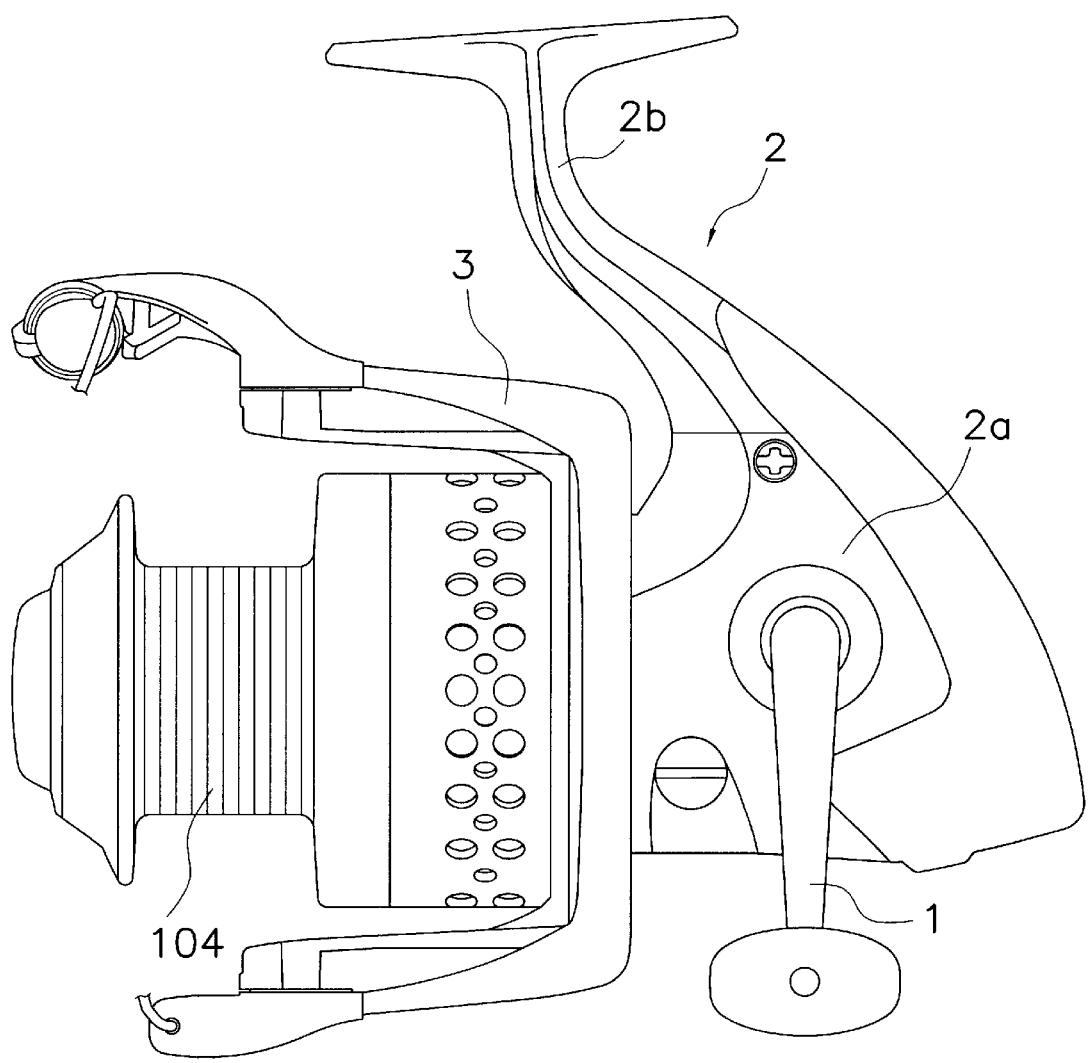
FIG. 6 is a left-side plan view of the spinning reel in accordance with the second embodiment, corresponding to FIG. 1.
Figure 7:
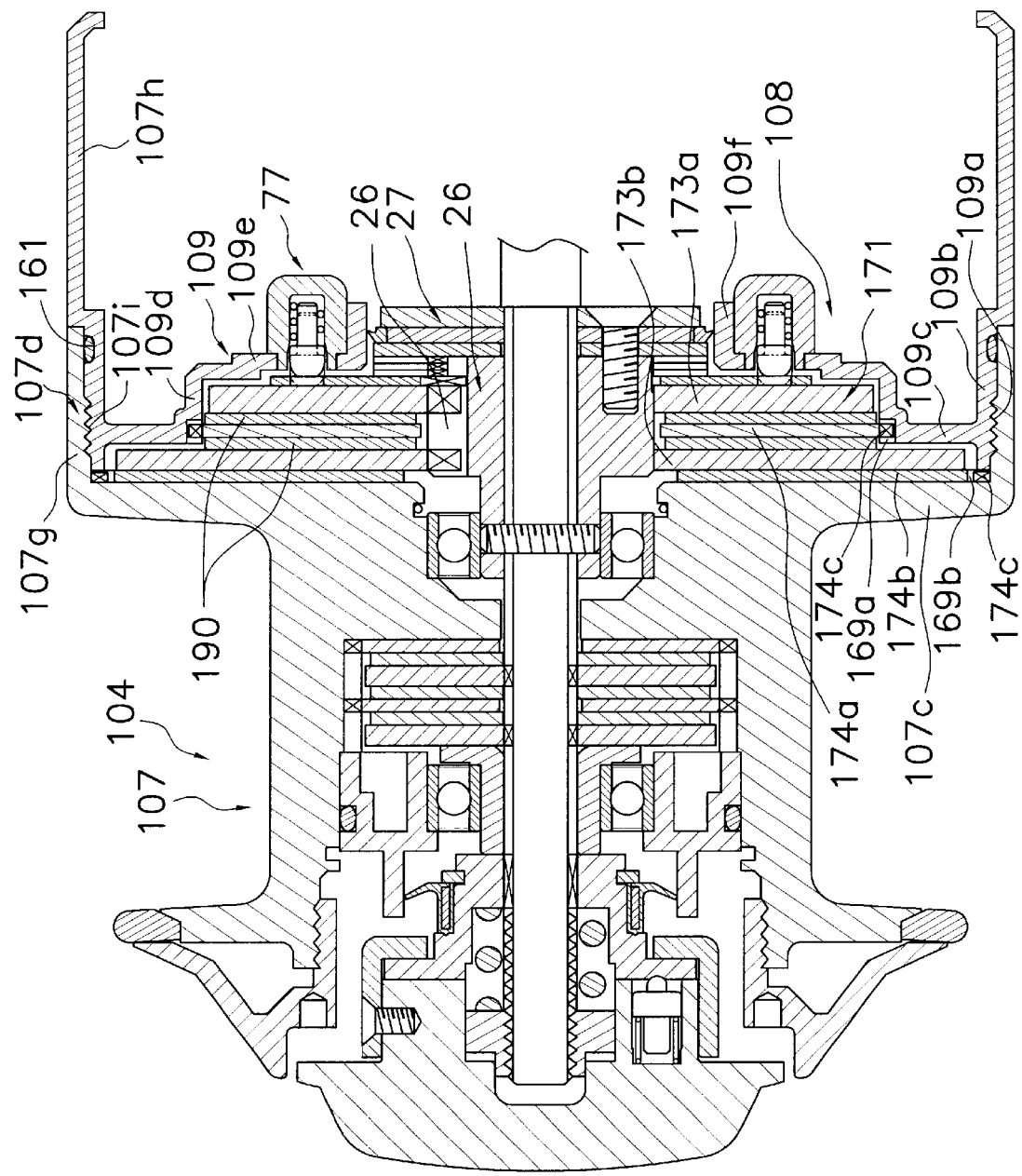
FIG. 7 is an enlarged sectional view of he spool section of the spinning reel in accordance with the second embodiment, corresponding to FIG. 3.
Figure 8:
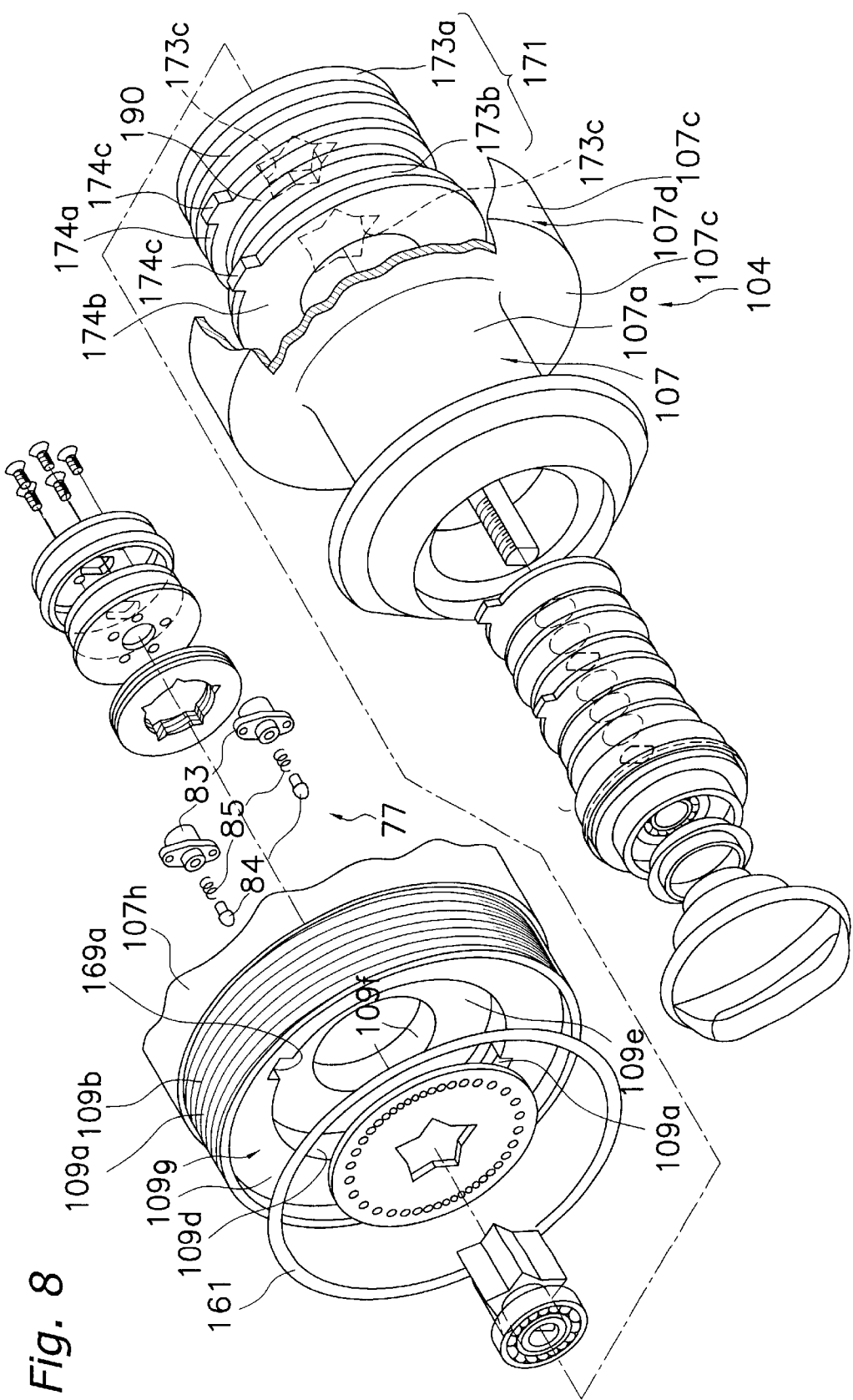
FIG. 8 is an exploded oblique view of the spool in accordance with the second embodiment, corresponding to FIG. 5.

In the first embodiment, the cover member 9 is disposed along an inner margin of the rear flange portion 7c from its outer periphery, but as shown in FIGS. 6 and 7, a cover member 109 for a spool 104 may be formed as a unit with a skirt portion 107d. Forming the cover member 109 and the skirt portion 107d unitarily in this way enables utilizing for the spool body 7—which is constantly in contact with wet fishing line and moreover requires strength—materials subjected to a high-corrosion-resistance surface treatment with an emphasis on strength; and utilizing for the skirt portion 107d—whose demand for strength is comparatively low, but which, not being coiled with fishing line, is superficially exposed—surface treatments that are decorative and materials that are lustrous. Highly decorative spools may therefore be offered that lend a classic feel while maintaining corrosion resistance.

In the following description, that parts to the spool 4 that differ from the foregoing embodiment, namely the rear flange portion 107c, the skirt portion 107d, the cover member 109, and a first friction unit 171 in a drag mechanism 108, will be explained.

The skirt portion 107d includes a first section 107g, formed integrally with the rear flange portion 107c and extending rearward from the outer periphery of the rear flange portion 107c, and a second section 107h extending rearward from the cover member 109, flush with the first section 107g. Female threads 107i together with which the cover member 109 screws are formed on the inner periphery of the first section 107g of the skirt portion 107d. The skirt portion 107d, which is formed integrally with the bobbin trunk portion, is for example a die-cast aluminum article superficially treated taking strength and corrosion resistance into consideration.

The cover member 109 includes: a first round-cylinder portion 109b formed with male threads 109a that screw together with the female threads 107i on the first section 107g; a first circular-plate portion 109c extending inward from the inner periphery of the first round-cylinder portion 109b; a second round-cylinder portion 109d extending rearward from the inner periphery of the first circular-plate portion 109c; a second circular-plate portion 109e extending inward from the rear edge of the second round-cylinder portion 109d; and a third round-cylinder portion 109f extending rearward from the inner periphery of the second circular-plate portion 109e. The cover member 109 is, for example, a drop-forged aluminum article, and is lightweight and highly decorative. The first round-cylinder portion 109b is formed integrally with the second section 107h that is ranged with the first section 107g of the skirt portion 107d. Therefore, the first round-cylinder portion 109b is with respect to the second section 107h smaller in diameter only by the approximate thickness of the first section 107g. To the front of the first round-cylinder portion 109b, a pair of second interlock-slots 169b is formed in the inner circumferential surface of the skirt portion 107d. A second disk 174b of the first friction unit 171 is fitted non-rotatably into the second interlock-slots 169b.

The first circular-plate portion 109c is located somewhat to the rear of the fore edge of the first round-cylinder portion 109b; and to the front of the first circular-plate portion 109c, a compartment is formed in between it and the rear flange 107c.

The second round-cylinder portion 109d comes into a position along the inner periphery of the fore end of the rotor 3 round-cylinder portion 30. A pair of first interlock-slots 169a is formed in the fore-end inner periphery of the second round-cylinder portion 109d. A second disk 174a in the first friction unit 171 interlocks non-rotatably into the first interlock-slots 169a. The drag-sounding mechanism 77 is mounted onto the second circular-plate portion 109e. The third round-cylinder portion 109f is located outward of the restrictor 27.

The first friction unit 171 includes two first disks 173a, 173b; and two second disks 174a, 174b, arranged alternately with the first disks 173a, 173b. These disks are, except for second disk 174b among the disks, together fabricated from, e.g., a stainless alloy. Further, second disk 174b is manufactured of, e.g., carbon graphite. The first disks 173a, 173b are interlocked non-rotatably onto the interlocking portion 26b formed on the support-unit body 26 in the first support unit 25. First disk 173b is larger in diameter than first disk 173a, and is disposed at the front face of the first circular-plate portion 109c. Drag disks 190 fabricated of carbon graphite are interposed respectively in between first disk 173a and second disk 174a, and in between second disk 174a and first disk 173b. The second disks 174a, 174b each have tabs 174c that interlock into the respective first and second interlock-slots 169a, 169b, whereby they are locked non-rotatably to the cover member 109 and the spool body 107, respectively.

A first sealing member 161 consisting of an O-ring is fitted in between the fore-end inner periphery of the first section 107g of the skirt portion 107d, and the outer circumferential surface of the first round-cylinder portion 109b of the cover member 109.

In a thus-configured spool 104, because the gaps between the cover member 109, and the spool body 107 and the first support unit 25 are sealed, liquids are prevented from getting into the first friction unit 171 through the spool rear. Further, because the cover member 109, which need not be corrosion resistant, and the second section 107h of the skirt portion 107d are unitarily formed, the material qualities of the second section 107h of the skirt portion 107d may be determined giving priority to decorativeness. Further, the material qualities of the spool body 107, except for the second section 107h of the skirt portion 107d, may be determined giving priority to strength and corrosion resistance. This maintains the corrosion resistance of the areas of the spool 104 in contact with fishing line, while allowing the decorativeness of the skirt portion 107d to be improved.

Third Embodiment

In the second embodiment, the first friction unit 171 and the second friction unit 172 each are configured with two first disks and two second disks, but either may be configured with one first disk and one second disk. In the following description, only the configurational features will be explained.

Figure 9:
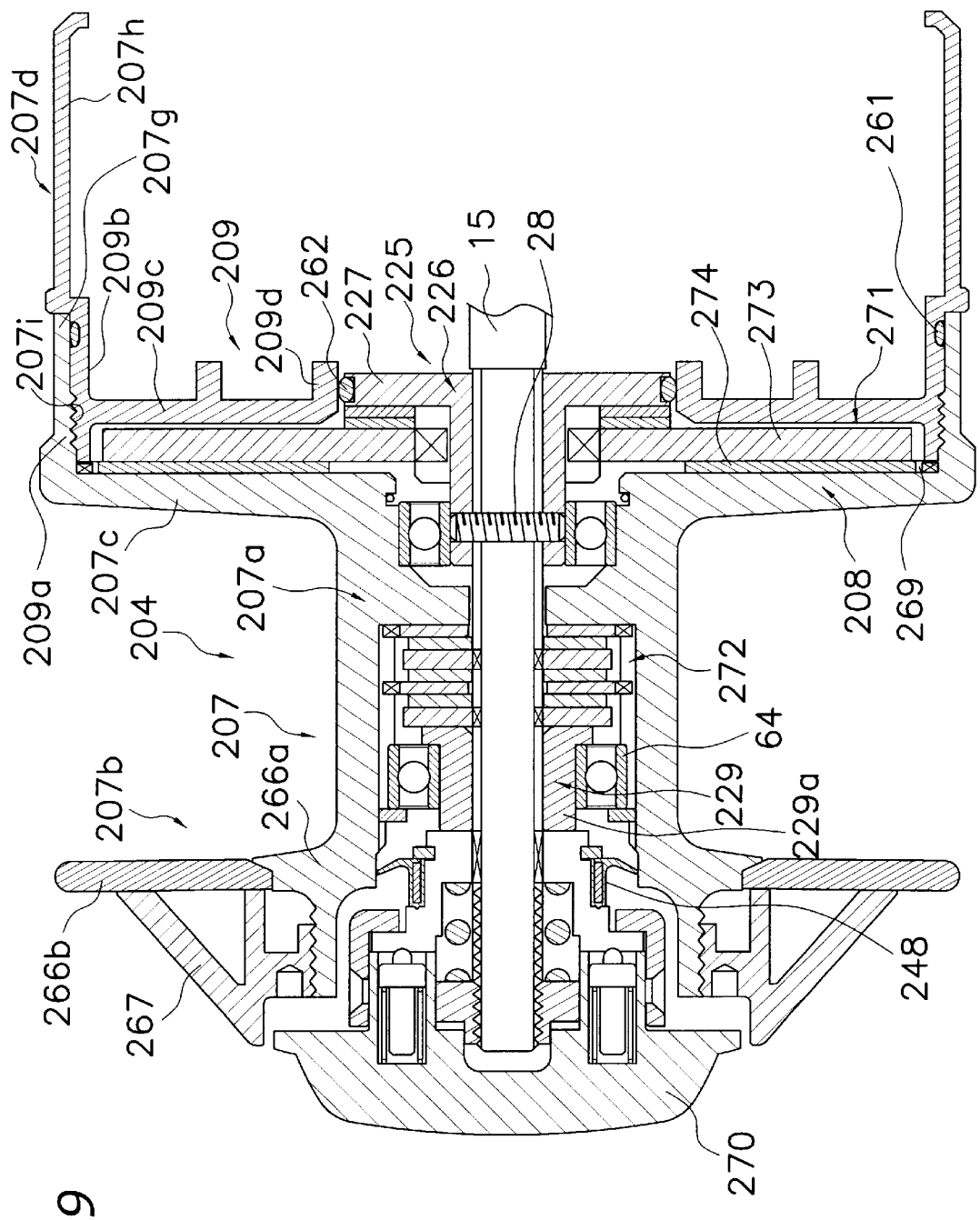
FIG. 9 is an enlarged sectional view of the spool section of the spinning reel in accordance with the third embodiment of the present invention, corresponding to FIG. 3.

Set forth in FIG. 9, spool 204 includes bobbin trunk portion 207a slenderer in diameter than in the foregoing embodiment. This makes the housing compartment for second friction unit 272 accordingly narrower. Likewise, outside flange piece 266b to front flange portion 207b is made greater in surface area compared to inside flange part 266a. Flange-fastening member 267 therefore presses on the outside flange piece 266b in two different places spaced at a diametric interval. Furthermore, the flange-fastening member 267 is screwed onto the outer circumferential surface at the front end of the bobbin trunk portion 207a.

A first support unit 225 is mounted non-rotatably, axially immovably on the spool shaft 15 by means of stop screws 28, and includes a tubular support-unit body 226 having a brim portion 227. A second sealing member 262 consisting of an O-ring is fitted onto the brim portion 227. A second support unit 229 includes just an inside component 229a mounted non-rotatably, axially immovably on the spool shaft 15. The inner race of the bearing 64 is mounted on the inside component 229a, and the outer race is fitted into the bobbin trunk portion 207a.

A third sealing member 248 fitted onto drag-handling unit 270 directly contacts on the inner circumferential surface of the bobbin trunk portion 207a. The drag-handling unit 270 may be of the same configuration as in the foregoing embodiment, which maintains the compatibility of the drag-handling unit 270 as well as the third sealing member 248.

The first friction unit 271 in the drag mechanism 208 includes a first disk 273, and a second disk 274. The first disk 273 is mounted non-rotatably on the first support unit 225, and the second disk 274 is interlocked non-rotatably into a pair of interlock slots 269 formed in the spool body 207.

The second friction unit 272 is structurally similar to, though differing in diameter from, the foregoing embodiment, in that it includes two third disks and fourth disks.

The cover member 209 includes: a first round-cylinder portion 209b formed with male threads 209a that screw together with the female threads 207i on the first section 207g of the skirt portion 207d; a first circular-plate portion 209c extending inward from the inner periphery of the first round-cylinder portion 209b; a second round-cylinder portion 209d extending rearward from the inner periphery of the first circular-plate portion 209c; and a second circular-plate portion 209e extending inward from the rear edge of the second round-cylinder portion 209d. The cover member 209, manufactured of, e.g., 6-gauge die-cast aluminum alloy (JIS), is lightweight aluminum alloy having a highly decorative quality. A corrosion-resistant film is formed on this raw material by subjecting it to an AA-15 (JIS) specification anodizing process. The first round-cylinder portion 209b is formed integrally with the second section 207h that is ranged with the first section 207g of the skirt portion 207d. Therefore, the first round-cylinder portion 209b is with respect to the second section 207h smaller in diameter only by the approximate thickness of the first section 207g. To the front of the first round-cylinder portion 209b, a pair of second interlock-slots 269b is formed in the inner circumferential surface of the skirt portion 207d. A second disk 274 of the first friction unit 271 is, as described earlier, fitted non-rotatably into the interlock-slots 269.

The circular-plate portion 209c is located somewhat to the rear of the fore edge of the first round-cylinder portion 209b. A compartment is formed in between the front of the circular-plate portion 209c and the rear flange 207c. The second round-cylinder portion 209d is disposed outward of the brim portion 227. The second sealing member 262 is fitted in between the second round-cylinder portion 209d and the brim portion 227.

In a thus-configured spool 204, since the cover member 209 and the second section 207h of the skirt portion 207d-the restrictions on which are loose from a corrosion resistance aspect, and which need not be so strong-are formed integrally, the material qualities of the second section 207h of the skirt portion 207d may be determined laying stress on decorativeness rather than corrosion resistance. Likewise, the material qualities of the spool body 207 except for the second section 207h of the skirt portion 207d may be determined giving priority to corrosion resistance and strength. This enables corrosion resistance to be maintained in the areas of the spool 204 constantly in contact with fishing line, and decorativeness of the skirt portion 207d to be improved.

Fourth Embodiment

Figure 10:
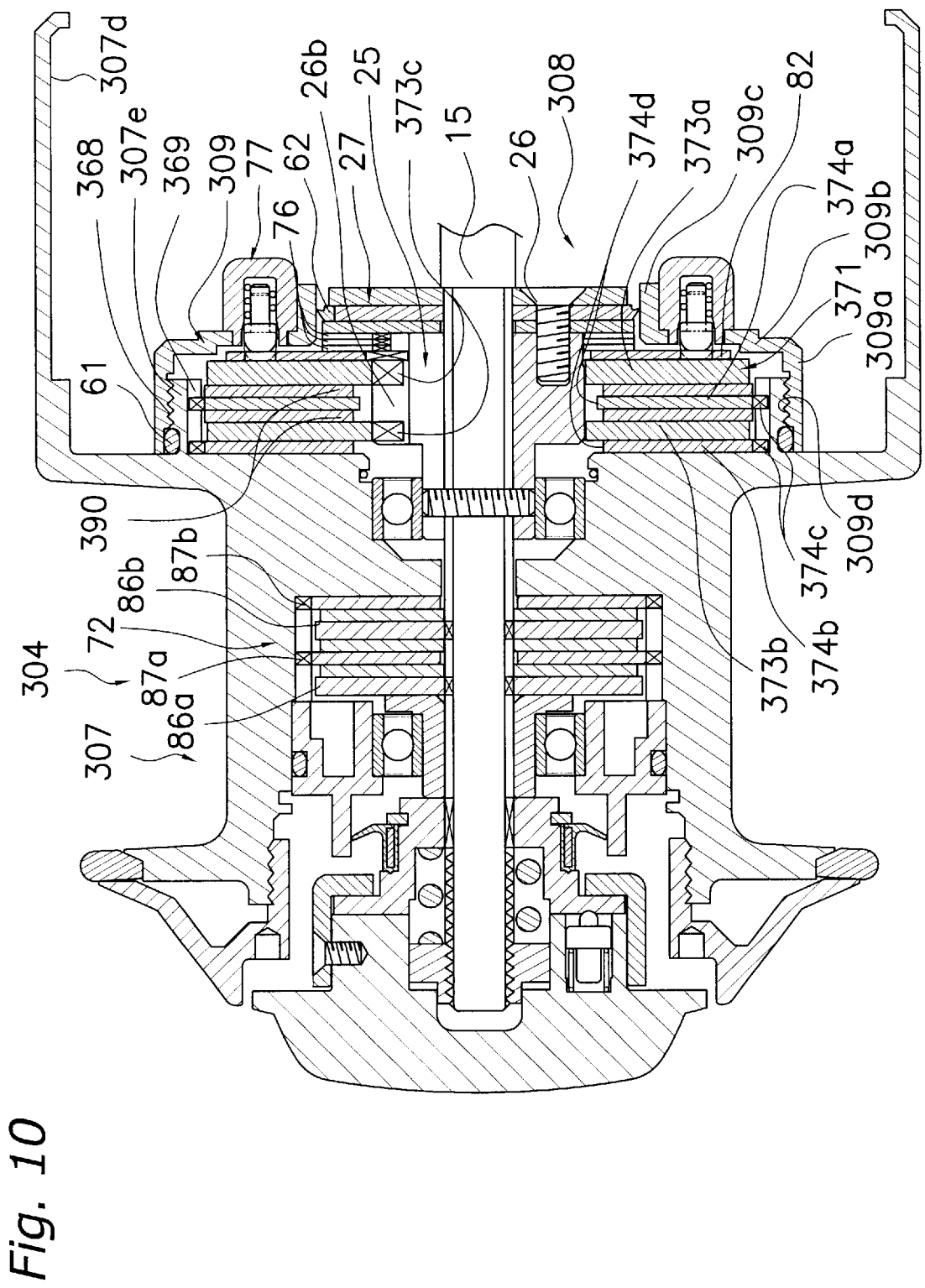
FIG. 10 is an enlarged sectional view of the spool section of the spinning reel in accordance with the fourth embodiment of the present invention, corresponding to FIG. 3.

In the second embodiment, the first disks 173a, 173b and second disks 174a, 174b have different diameter, but, as shown in FIGS. 10 and 11, the first disks and second disks may have substantially same diameter. In the following description, only the configurational features will be explained.

Shown in FIGS. 10 and 11, the first friction unit 371 includes: two first disks 373a, 373b, non-rotatable with respect to the spool shaft 15; and two second disks 374a, 374b, non-rotatable with respect to the spool body 307 and arranged in alternation, to enable them to be compressed, with the first disks 373a, 373b. In addition, via three adjustment washers 376 the restrictor 27 restricts movement of the first friction unit 371 rearward in the spool axial direction. Drag disks 390 fabricated of, e.g., carbon graphite are fitted in between first disk 373a and second disk 374a, and in between second disk 374a and first disk 373b. The cover member 309 covers the first friction unit 371; and liquids are prevented from seeping into the interior through the rear thereof by the first and second sealing members 61, 62.

Through the center of the first disks 373a, 373b a component fabricated from, e.g., a stainless alloy, is an interlock hole 373c having a five-pointed-star contour, into which the interlocking portion 26b formed on the support-unit body 26 in the first support unit 25 interlocks. Accordingly, the first disks 373 are non-rotatable with respect to the spool shaft 15, and—because the spool shaft 15 is non-rotatable with respect to the reel unit 2—is made non-rotatable with respect to the reel unit 2. Rearward movement of the first disk 373a is restricted by contact with the restrictor 27 via a (later-described) sound-emitting disk 82 of drag-sounding mechanism 77 Second disk 374a is a component fabricated of, e.g., a stainless alloy; and second disk 374b is a component fabricated of, e.g., carbon graphite. These second disks 374a, 374b generate drag force by rotating relative to the first disks 373a, 373b. The first disks 373a, 373b and the second disks 374a, 374b have substantially same diameter. On the outer periphery of second disks 374a, 374b are tabs 374c that interlock into the first interlock slots 369, and at the inner periphery is a through-hole 374d through which the first support unit 25 passes. The second disks 374a, 374b are thereby non-rotatable with respect to the spool body 7.

The second friction unit 72 is structurally similar to the first embodiment, in that it includes two third disks 86a, 86b and fourth disks 87a, 87b.

Herein, because a plurality of disks 373a, 373b, 374a, 374b; and 86a, 86b 87a, 87b are furnished respectively in two friction units 371, 72, the number of disks in each friction unit 371, 72 may be increased. Therefore, even if the number of disks in the first friction unit 371 is restricted, by means of the second friction unit 72 sufficient drag force can be gained easily.

Other Embodiments (a) In the foregoing four embodiments, the second friction unit is furnished in the interior of the spool bobbin-trunk portion, but the bobbin trunk portion may be made diametrically smaller by not furnishing the second friction unit. In this case, the drag handling unit may be made to contact the front-end face of the bobbin trunk portion to press on the spool body, and may also press on the spool body via a bearing supporting the spool.

(b) In the first embodiment, an example with an O-ring as the first sealing member, and with a rimmed sealing element as the second sealing member was illustrated, but the types of sealing member are not limited to these, and may take any form as long as they seal the gaps. For example, labyrinth seals comprising grooves, and fluid seals employing magnetic fluids are included as sealing members.

(c) In the foregoing embodiments, the second support unit 29 is disposed to the front of the second friction unit 72, but the second support unit 29 may be disposed to the rear. In this case, liquids may be prevented from seeping into the second friction unit 72 through the spool front if the third sealing means is fitted to the drag-handling unit 70 and is made to contact the inner circumferential surface of the drag-housing compartment 65 in that it covers the front of the second friction unit 72.

(d) In the foregoing embodiment, the entire spool is made of metal; but the spool body may, taking corrosion resistance into account, be made of a synthetic resin, while the skirt portion including the cover member may, taking decorativeness into account, be made of a stainless alloy.

(e) Surface treatment is one example of a material quality in the foregoing embodiment; but the spool body may utilize any sort of material quality or surface treatment as long as corrosion resistance is taken into account. Likewise, the skirt portion may have any sort of material quality or surface treatment as long as decorativeness is taken into account.

In terms of the present embodiments, the fact that the first friction unit is covered over its rear with the cover member, and that the gaps between the cover member, and the rear flange and the spool shaft are sealed by sealing components, means that even if liquids seep through the gap between the spool and the rotor, the liquids are not likely to seep into the drag mechanism. Therefore, the first friction unit is not liable to become wet, which controls fluctuations in drag force.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Applications No. 2001-148816, 2001-148817, and 2001-148818. The entire disclosure of Japanese Patent Applications No. 2001-148816, 2001-148817, and 2001-148818 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spinning-reel spool adapted to be mounted on a spool shaft that is installed in a spinning-reel reel body so as to be shiftable in a front-rear direction, said spinning-reel spool comprising:

a spool body having a tubular bobbin-trunk portion that can be rotatably mounted on the spool shaft, and front and rear flange portions that are diametrically larger than said bobbin trunk portion and are provided respectively on front and rear portions of said bobbin trunk portion;

a drag mechanism having a drag-handling unit that can be screwed onto a front end of the spool shaft so as to press said bobbin trunk portion, and a first friction unit that is disposed so as to contact a rear face of said rear flange portion, a rearward movement of said first friction unit being restricted by the spool shaft;

a cover member installed non-rotatably on said spool body so as to cover said first friction unit from rear;

first sealing means fitted in between said cover member and said spool body for sealing a gap therebetween; and second sealing means fitted in between the spool shaft and said cover member for sealing a gap therebetween.

2. The spinning-reel spool set forth in claim 1, wherein:

said spool body has a tubular skirt portion extending rearward from an outer periphery of said rear flange portion.

3. The spinning-reel spool set forth in claim 2, wherein:

a tip of a cylindrical portion of a rotor can be disposed in between said skirt portion and an outer periphery of said cover member, the rotor being for winding a fishing line around said bobbin trunk portion.

4. The spinning-reel spool set forth in claim 1, further comprising:

a first support unit mounted non-rotatably and axially immovably on the spool shaft, said first support unit rotatably supporting said bobbin trunk portion via a bearing, said second sealing means being fitted to said first support unit and sealing a gap between said first support unit and said cover member.

5. The spinning-reel spool set forth in claim 1, wherein said second sealing means is a rimmed sealing member having a lip whose distal edge is pointed while contacting said cover member.

6. The spinning-reel spool set forth in claim 1, wherein:

said rear flange portion has a tubular drag-housing portion formed on its rear face, said tubular drag-housing portion projecting rearward for housing said first friction unit;

said cover member screws onto an outer circumferential surface of said drag-housing portion; and said first sealing means is an O-ring fitted in between said outer circumferential surface of said drag-housing portion and said cover member.

7. The spinning-reel spool set forth in claim 1, further comprising third sealing means disposed at the front face of said spool body for sealing a gap between said bobbin trunk portion and the spool shaft.

8. The spinning-reel spool set forth in claim 1, further comprising a sounding mechanism installed on said cover member such that said sounding mechanism issues sound during operation of said drag mechanism.

9. The spinning-reel spool set forth in claim 1, wherein said first friction unit has at least one first disk that is non-rotatable with respect to the spool shaft, and at least one second disk that is non-rotatable with respect to said spool body, said second disk being disposed alternately with said first disk.

10. The spinning-reel spool set forth in claim 7, wherein said bobbin trunk portion forms inside a tubular drag-housing compartment, and said drag mechanism has a second friction unit that is pressed on by said drag-handling unit and is housed in said drag-housing compartment such that an axial movement of said second friction unit is restricted.

11. The spinning-reel spool set forth in claim 10, further comprising a second support unit disposed in between said second friction unit and said drag-handling unit so as to be shiftable axially on the spool shaft, said second support unit rotatably supporting said bobbin trunk portion via a bearing.

12. The spinning-reel spool set forth in claim 11, wherein said third sealing means has a third sealing member that is fitted in between said second support unit and said drag-handling unit and seals a gap therebetween, and a fourth sealing unit that is fitted in between said second support unit and said bobbin trunk portion and seals a gap therebetween.

13. The spinning-reel spool set forth in claim 2, wherein said skirt portion at least partially includes a tubular portion formed unitarily with said cover member.

14. The spinning-reel spool set forth in claim 13, wherein said skirt portion has a first section formed integrally with said rear flange portion and extending rearward from the outer periphery of said rear flange portion, and a second section, which is said tubular portion and is formed integrally with said cover member and extending rearward from said first section, and said cover member is affixed to said spool body by being screwed to an inner circumferential surface of said first section.

15. The spinning-reel spool set forth in claim 1, wherein said spool body is made of one of a highly corrosion-resistant aluminum alloy and an aluminum alloy subjected to a high-corrosion-resistance surface treatment.

16. The spinning-reel spool set forth in claim 10, wherein said second friction unit is pressed on by said drag-handling unit and housed in said drag-housing compartment such that the axial movement of said second friction unit is restricted, said second friction unit having a plurality of third disks that is non-rotatable with respect to the spool shaft and a plurality of fourth disks that is arranged alternately with said third disks and non-rotatable with respect to said spool body.

17. The spinning-reel spool set forth in claim 16, further comprising drag disks that are fitted in between said first disk and second disk, as well as between said third disks and fourth disks.

18. A spinning reel, comprising:

a reel unit that rotatably carries a handle, said reel unit having a spool shaft therein;

a rotor rotatably carried on a front portion of said reel unit; and a spool disposed on said spool shaft so as to be shiftable front and back, said spool including a spool body having a tubular bobbin-trunk portion that can be rotatably mounted on said spool shaft, and front and rear flange portions that are diametrically larger than said bobbin trunk portion and are provided respectively on front and rear portions of said bobbin trunk portion;

a drag mechanism having a drag-handling unit that can be screwed onto a front end of said spool shaft so as to press said bobbin trunk portion, and a first friction unit that is disposed so as to contact a rear face of said rear flange portion, a rearward movement of said first friction unit being restricted by said spool shaft;

a cover member installed non-rotatably on said spool body so as to cover said first friction unit from rear;

first sealing means fitted in between said cover member and said spool body for sealing a gap therebetween; and second sealing means fitted in between the spool shaft and said cover member for sealing a gap therebetween.

* * * * *